US012407853B2

(12) United States Patent
Sullivan et al.

(10) Patent No.: US 12,407,853 B2
(45) Date of Patent: *Sep. 2, 2025

(54) SIGNALING OF STATE INFORMATION FOR A DECODED PICTURE BUFFER AND REFERENCE PICTURE LISTS

(71) Applicant: Microsoft Technology Licensing, LLC, Redmond, WA (US)

(72) Inventors: Gary J. Sullivan, Bellevue, WA (US); Yongjun Wu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/386,778

(22) Filed: Nov. 3, 2023

(65) Prior Publication Data

US 2024/0080475 A1   Mar. 7, 2024

Related U.S. Application Data

(63) Continuation of application No. 17/850,622, filed on Jun. 27, 2022, now Pat. No. 11,849,144, which is a
(Continued)

(51) Int. Cl.
*H04N 19/58* (2014.01)
*H04N 19/423* (2014.01)
(Continued)

(52) U.S. Cl.
CPC .......... *H04N 19/58* (2014.11); *H04N 19/423* (2014.11); *H04N 19/46* (2014.11); *H04N 19/573* (2014.11); *H04N 19/70* (2014.11)

(58) Field of Classification Search
CPC ...... H04N 19/58; H04N 19/423; H04N 19/46; H04N 19/573; H04N 19/70
See application file for complete search history.

(56) References Cited

U.S. PATENT DOCUMENTS 6,956,545 B2 * 10/2005 McClintock ............. G09G 5/12
345/55
9,313,500 B2    4/2016 Sullivan et al.
(Continued)

FOREIGN PATENT DOCUMENTS

KR      10-2344167     12/2021
WO   WO 2013/109183    7/2013

OTHER PUBLICATIONS

Notice of Allowance dated Oct. 4, 2023, from U.S. Appl. No. 17/850,622, 11 pp.
(Continued)

*Primary Examiner* — Richard A Hansell, Jr.
(74) *Attorney, Agent, or Firm* — Klarquist Sparkman, LLP

(57) ABSTRACT

Innovations for signaling state of a decoded picture buffer ("DPB") and reference picture lists ("RPLs"). In example implementations, rather than rely on internal state of a decoder to manage and update DPB and RPLs, state information about the DPB and RPLs is explicitly signaled. This permits a decoder to determine which pictures are expected to be available for reference from the signaled state information. For example, an encoder determines state information that identifies which pictures are available for use as reference pictures (optionally considering feedback information from a decoder about which pictures are available). The encoder sets syntax elements that represent the state information. In doing so, the encoder sets identifying information for a long-term reference picture ("LTRP"), where the identifying information is a value of picture order count least significant bits for the LTRB. The encoder then outputs the syntax elements as part of a bitstream.

15 Claims, 6 Drawing Sheets

Related U.S. Application Data continuation of application No. 17/112,304, filed on Dec. 4, 2020, now Pat. No. 11,418,809, which is a continuation of application No. 16/546,871, filed on Aug. 21, 2019, now Pat. No. 10,924,760, which is a continuation of application No. 15/952,796, filed on Apr. 13, 2018, now Pat. No. 10,432,964, which is a continuation of application No. 13/669,380, filed on Nov. 5, 2012, now Pat. No. 10,003,817.

(60) Provisional application No. 61/556,813, filed on Nov. 7, 2011.

(51) Int. Cl.
   *H04N 19/46*    (2014.01)
   *H04N 19/573*   (2014.01)
   *H04N 19/70*    (2014.01)

(56) References Cited

U.S. PATENT DOCUMENTS

| | | | |
|---|---|---|---|
| 9,762,928 B2 | 9/2017 | Sullivan et al. | |
| 10,003,817 B2 | 6/2018 | Sullivan et al. | |
| 10,165,302 B2 | 12/2018 | Sullivan et al. | |
| 10,432,964 B2 | 10/2019 | Sullivan et al. | |
| 10,560,720 B2 | 2/2020 | Sullivan et al. | |
| 10,924,760 B2 | 2/2021 | Sullivan et al. | |
| 11,012,709 B2 | 5/2021 | Sullivan et al. | |
| 11,405,636 B2 | 8/2022 | Sullivan et al. | |
| 11,418,809 B2 | 8/2022 | Sullivan et al. | |
| 11,770,553 B2 | 9/2023 | Sullivan et al. | |
| 11,770,554 B2 | 9/2023 | Sullivan et al. | |
| 11,778,229 B2 | 10/2023 | Sullivan et al. | |
| 11,849,144 B2 | 12/2023 | Sullivan et al. | |
| 12,003,753 B2 * | 6/2024 | Lim | H04N 19/61 |
| 2009/0238269 A1 * | 9/2009 | Pandit | H04N 19/176 |
| | | | 375/E7.243 |
| 2009/0262804 A1 * | 10/2009 | Pandit | H04N 19/51 |
| | | | 375/E7.243 |
| 2010/0189173 A1 * | 7/2010 | Chen | H04N 19/573 |
| | | | 375/E7.026 |
| 2010/0195721 A1 * | 8/2010 | Wu | H04N 19/70 |
| | | | 375/E7.255 |
| 2012/0294366 A1 * | 11/2012 | Eliyahu | H04N 19/43 |
| | | | 375/E7.123 |
| 2013/0003823 A1 * | 1/2013 | Misra | H04N 19/174 |
| | | | 375/E7.126 |
| 2013/0077679 A1 * | 3/2013 | Wang | H04N 19/50 |
| | | | 375/E7.243 |
| 2013/0077687 A1 * | 3/2013 | Wang | H04N 19/70 |
| | | | 375/E7.243 |
| 2013/0094585 A1 * | 4/2013 | Misra | H04N 19/70 |
| | | | 375/E7.243 |
| 2013/0094772 A1 * | 4/2013 | Deshpande | H04N 19/46 |
| | | | 382/233 |
| 2013/0114741 A1 | 5/2013 | Sullivan et al. | |
| 2013/0215975 A1 * | 8/2013 | Samuelsson | H04N 19/58 |
| | | | 375/240.25 |
| 2014/0092991 A1 | 4/2014 | Sullivan et al. | |
| 2014/0126640 A1 * | 5/2014 | Samuelsson | H04N 19/46 |
| | | | 375/240.16 |
| 2015/0016505 A1 | 1/2015 | Sjoberg et al. | |
| 2019/0116379 A1 | 4/2019 | Sullivan et al. | |
| 2023/0412836 A1 | 12/2023 | Sullivan et al. | |

OTHER PUBLICATIONS

Notice of Preliminary Rejection dated Feb. 6, 2024, from Korean Patent Application No. 10-2023-7020078, 13 pp.
Office Action dated Mar. 28, 2024, from U.S. Appl. No. 18/232,193, 7 pp.
Communication under Rule 71(3) EPC dated Jun. 7, 2024, from European Patent Application No. 21155916.6, 8 pp.
Decision to Grant dated Oct. 10, 2024, from European Patent Application No. 21155916.6, 2 pp.
Office Action dated Jul. 30, 2024, from U.S. Appl. No. 18/232,193, 8 pp.
Bross et al., "High Efficiency Video Coding (HEVC) Text Specification Draft 6," JCTVC-H1003, 259 pp. (Feb. 2012).
Bross et al., "High Efficiency Video Coding (HEVC) Text Specification Draft 8," JCTVC-J1003_d0, 284 pp. (Jul. 2012).
Communication Pursuant to Rules 70(2) and 70a(2) EPC and reference to Rule 39(1) EPC dated Jan. 27, 2025, from European Patent Application No. 24201660.8, 2 pp.
Communication pursuant to Rules 70(2) and 70a(2) EPC and reference to Rule 39(1) EPC dated Feb. 3, 2025, from European Patent Application No. 24201657.4, 2 pp.
Decision to Grant dated Aug. 23, 2018, from European Patent Application No. 12848102.5, 1 p.
Decision to Grant dated Feb. 4, 2021, from European Patent Application No. 13774010.6, 2 pp.
Examination Report dated Mar. 30, 2016, from Australian Patent Application No. 2012336043, 4 pp.
Extended European Search Report dated Dec. 23, 2024, from European Patent Application No. 24201660.8, 9 pp.
Extended European Search Report dated Jan. 8, 2025, from European Patent Application No. 24201657.4, 7 pp.
Final Office Action dated Jan. 24, 2025, from U.S. Appl. No. 18/232,193, 9 pp.
Intimation to Grant for Indian Application No. 3320/CHENP/2014, mailed on Sep. 3, 2021, 1 page.
Office Action dated Apr. 25, 2016, from U.S. Appl. No. 15/064,299, 16 pp.
Office Action dated Mar. 28, 2018, from U.S. Appl. No. 15/655,797, 8 pp.
Office Action dated Jul. 20, 2015, from U.S. Appl. No. 13/781,710, 15 pp.
Notice of Allowance dated Apr. 29, 2020, from Argentina Patent Application No. 20130103543, 2 pp.
Notice of Allowance dated Aug. 14, 2018, from U.S. Appl. No. 15/655,797, 8 pp.
Notice of Allowance dated Dec. 7, 2015, from U.S. Appl. No. 13/781,710, 7 pp.
Notice of Allowance dated Nov. 1, 2016, from U.S. Appl. No. 15/064,299, 8 pp.
Notice of Allowance dated Apr. 18, 2017, from U.S. Appl. No. 15/064,299, 9 pp.
Notice of Allowance dated Apr. 6, 2018, from U.S. Appl. No. 13/669,380, 11 pp.
Notice of Grant dated Dec. 4, 2017, from Chinese Patent Application No. 201280054626.X, 4 pp.
Notification of Reasons for Refusal dated May 16, 2017, from Japanese Patent Application No. 2015/534584, 5 pp.
Notice of Preliminary Rejection dated Apr. 10, 2019, from Korean Patent Application No. 10-2014-7012129, 9 pp.
Notice of Preliminary Rejection dated Feb. 10, 2025, from Korean Patent Application No. 10-2023-7020078, 17 pp.
Office Action and Search Report dated Jul. 17, 2017, from Taiwanese Patent Application No. 102135102, 7 pp. [No English translation available].

* cited by examiner software 180 implementing one or more
innovations for signaling BDL information

Figure 7a

700 if( ( pic_order_cnt_lsb < prevPicOrderCntLsb ) && ( ( prevPicOrderCntLsb − pic_order_cnt_lsb ) >= ( MaxPicOrderCntLsb / 2 ) ) )
    PicOrderCntMsb = prevPicOrderCntMsb + MaxPicOrderCntLsb
else if( (pic_order_cnt_lsb > prevPicOrderCntLsb ) && ( (pic_order_cnt_lsb − prevPicOrderCntLsb ) > ( MaxPicOrderCntLsb / 2 ) ) )
    PicOrderCntMsb = prevPicOrderCntMsb − MaxPicOrderCntLsb
else
    PicOrderCntMsb = prevPicOrderCntMsb

Figure 7b

701 if( ( currPicOrderCntLsb < thatPicOrderCntLsb ) && ( ( thatPicOrderCntLsb − currPicOrderCntLsb ) > ( MaxPicOrderCntLsb / 2 ) ) )
    PicOrderCntVal = thatPicOrderCntLsb − MaxPicOrderCntLsb
else if( ( currPicOrderCntLsb > thatPicOrderCntLsb ) && ( ( currPicOrderCntLsb − thatPicOrderCntLsb ) > ( MaxPicOrderCntLsb / 2 ) ) )
    PicOrderCntVal = thatPicOrderCntLsb + MaxPicOrderCntLsb
else
    PicOrderCntVal = thatPicOrderCntLsb

SIGNALING OF STATE INFORMATION FOR A DECODED PICTURE BUFFER AND REFERENCE PICTURE LISTS

CROSS REFERENCE TO RELATED APPLICATION

This application is a continuation of U.S. patent application Ser. No. 17/850,622, filed Jun. 27, 2022, which is a continuation of U.S. patent application Ser. No. 17/112,304, filed Dec. 4, 2020, now U.S. Pat. No. 11,418,809, which is a continuation of U.S. patent application Ser. No. 16/546,871, filed Aug. 21, 2019, now U.S. Pat. No. 10,924,760, which is a continuation of U.S. patent application Ser. No. 15/952,796, filed Apr. 13, 2018, now U.S. Pat. No. 10,432,964, which is a continuation of U.S. patent application Ser. No. 13/669,380, filed Nov. 5, 2012, now U.S. Pat. No. 10,003,817, the disclosure of which is hereby incorporated by reference. U.S. patent application Ser. No. 13/669,380 claims the benefit of U.S. Provisional Patent Application No. 61/556,813, filed Nov. 7, 2011, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. More recently, the HEVC standard has been under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding.

A basic goal of compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, depending on the use scenario, considerations such as encoding time, encoding complexity, encoding resources, decoding time, decoding complexity, decoding resources, overall delay, loss recovery capability, and/or smoothness in playback also affect decisions made during encoding and decoding.

Typically, a video encoder or decoder buffers previously decoded pictures, which the video encoder or decoder can use when encoding or decoding other pictures. Such reconstructed and buffered pictures are often called reference pictures. Some video codec standards describe elaborate rules for managing and updating which reference pictures are buffered, and which reference pictures are no longer used for reference. This can permit an encoder to improve compression efficiency by making good decisions about which reference pictures to use, but the process of managing and updating reference pictures can be complicated for the encoder and decoder. Also, a decoder uses various pieces of information in the bitstream of encoded video data to track and update the state of its reference picture buffer and lists of reference pictures. Loss of information from the bitstream (e.g., due to packet loss or corruption) can adversely affect decoding for a significant period of time if the internal state of the decoder for its reference picture buffer and/or lists of reference pictures deviates from the expected state, and the decoder no longer uses the appropriate reference pictures.

SUMMARY

In summary, the detailed description presents innovations for signaling state of a decoded picture buffer ('DPB') and reference picture lists. The innovations can reduce bitrate associated with signaling of state information for DPB and reference picture list ("RPL") management, and improve DPB management and/or RPL management in various other respects, while still providing robustness against loss of state-affecting information.

Rather than rely on internal state of a decoder to manage and update DPB and RPLs, state information about the DPB and RPLs is explicitly signaled. This permits the decoder to determine which pictures are expected to be available for reference in the DPB from the signaled state information, which identifies which pictures are currently available for reference. Such state information can be referred to as buffer description list ("BDL") information, which generally refers to any form of information that expressly indicates state of a DPB and/or RPLs.

Innovations described herein include, but are not limited to the following:

Using a future reference flag per reference picture in BDL information, where the future reference flag indicates whether the reference picture is only used for decoding of the current picture (associated with the BDL information) or instead is used for decoding of at least one subsequent picture in coded order. Use of this flag can permit the storage of an additional reference picture in the DPB.

Using an on/off decision flag for use of the future reference flag. For example, the on/off decision flag can be signaled as part of a sequence parameter set ("SPS") and indicate presence/absence of future reference flags in BDL information. This can permit an encoder to decide whether or not to use future reference flags in BDL information.

In BDL information for a picture associated with a higher temporal layer, permitting reference picture marking information to mark one or more pictures in a lower temporal layer as being unused for reference. While such behavior may be uncommon in practice, in some scenarios it may be useful to permit such options for reference picture management for pictures in a higher temporal layer. And, when later BDL information lacks status information for reference pictures previously removed with BDL information for a picture at the higher temporal layer, the decoder can infer the removal of such reference pictures.

Using a higher layer picture designation flag per picture of a higher temporal layer in BDL information, where the higher layer picture designation flag designates a picture as relating to a higher temporal layer for purposes of the BDL information. In many scenarios, pictures of a higher temporal layer have little or no use as reference pictures, and the process of managing and updating the DPB can be simplified for such pictures. Where BDL information is used at all for pictures of a higher temporal layer, a simple flag per picture in the BDL information can suffice to designate the picture as being associated with a higher temporal layer, where the actions of managing and updating the DPB are implied.

Using an on/off decision flag for including status information about pictures of higher temporal layers in BDL information. For example, the on/off decision flag can be signaled as part of a SPS and indicate presence/absence of status information about pictures of higher temporal layers in BDL information.

The BDL information can be signaled at adaptive slice parameter set ("APS") level. A single set of BDL information is associated with an APS.

Simplifying the signaling of status information for a long-term reference picture ("LTRP") in BDL information. LTRPs provide a useful design element for video encoding and decoding, but accounting for management and updating of LTRPs in BDL information presents challenges. In particular, for a LTRP that remains in a DPB for a long time, the signaling of identifying information for the LTRP can consume a large number of bits and create special cases to address in bitstream parsing and decoding. Various versions of simplified syntax for LTRPs in BDL information are proposed herein, which reduce bitrate for LTRP status information and simplify DPB management. For example, a LTRP flag for a picture in the BDL information marks the picture as being an LTRP for purposes of DPB management.

Using an on/off decision for flag for including status information about LTRPs in BDL information. For example, the on/off decision flag can be signaled as part of a SPS and indicate presence/absence of status information about LTRPs in BDL information, which simplifies signaling of BDL information when an encoder has decided not to use LTRPs.

Reducing the number of bits used to identify LTRPs in BDL information. In many use scenarios, the number of reference pictures (and LTRPs) is small, and a small number of bits suffices to identify LTRPs. An encoder can increase the number of bits used to identify LTRPs for other use scenarios.

Organizing BDL information in the order used for construction of an RPL. This simplifies syntax for purposes of RPL construction.

Signaling whether gaps in picture order count ("POC") values are permitted. For example, a flag in an SPS indicates whether gaps in POC values are permitted. If gaps are not permitted, a decoder can recognize picture losses when it determines POC values are missing, and a decoder can make decisions about pictures being ready for output based on POC values.

Syntax elements in BDL information can be encoded using truncated Exp-Golomb coding (that is, te(v)) instead of unsigned Exp-Golomb coding. This is more efficient for syntax elements with a small number of possible values.

According to one aspect of the innovations described herein, a computing system determines state information that identifies which pictures are available for use as reference pictures. The computing system sets syntax elements that represent the state information. In particular, in doing so, the computing system sets identifying information for a LTRP, where the identifying information is a value of POC least significant bits ("POC LSBs") for the LTRB. The computing system then outputs the syntax elements as part of a bitstream.

According to another aspect of the innovations described herein, a computing system receives at least part of a bitstream. From the bitstream, the computing system parses syntax elements that represent state information identifying which pictures are available for use as reference pictures. In particular, the syntax elements include identifying information for a LTRP, wherein the identifying information is a value of POC LSBs for the LTRB. The computing system uses the identifying information during decoding.

The foregoing and other objects, features, and advantages of the invention will become more apparent from the following detailed description, which proceeds with reference to the accompanying figures.

BRIEF DESCRIPTION OF THE DRAWINGS

FIG. 7a is a pseudo-code listing for deriving the variable PicOrderCntMsb, and FIG. 7b is a pseudo-code listing for deriving the variable PicOrderCntVal.

DETAILED DESCRIPTION

The detailed description presents innovations for signaling state of a DPB and RPLs. The innovations can help reduce bitrate associated with BDL information and/or simplify the process of DPB management or RPL construction, while still supporting loss recovery.

Some of the innovations described herein are illustrated with reference to syntax elements and operations specific to the H.264 and/or HEVC standard. Such innovations can also be implemented for other standards or formats.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of signaling state of a DPB and RPLs can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
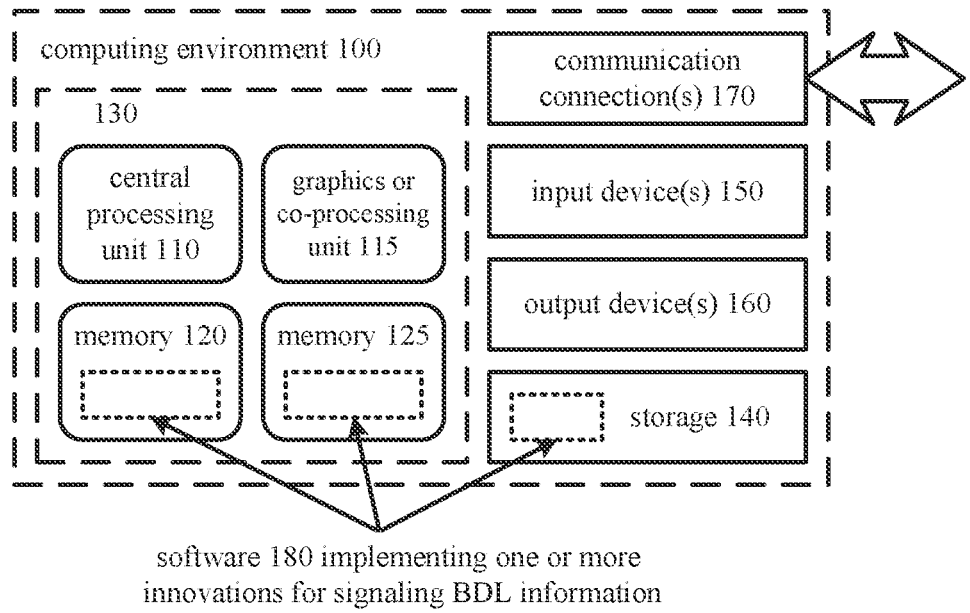
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for signaling BDL information, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information that can be accessed within the computing system (100). The storage (140) stores instructions for the software (180) implementing one or more innovations for signaling BDL information.

The input device(s) (150) may be a touch input device such as a keyboard, mouse, pen, or trackball, a voice input device, a scanning device, or another device that provides input to the computing system (100). For video encoding, the input device(s) (150) may be video capture component such as a camera, video card, TV tuner card, or similar device that accepts video input in analog or digital form, a video capture component such as a screen capture module that captures computer-generated screen images as video or similar component that captures computer-generated image content, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
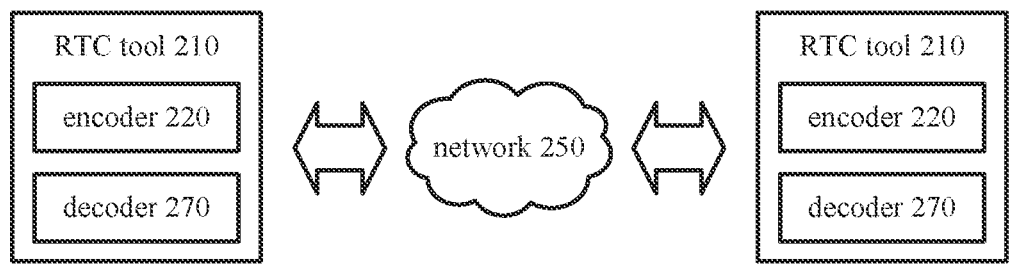
FIGS. 2a and 2b are diagrams of example network environments in which some described embodiments can be implemented.
Figure 2B:
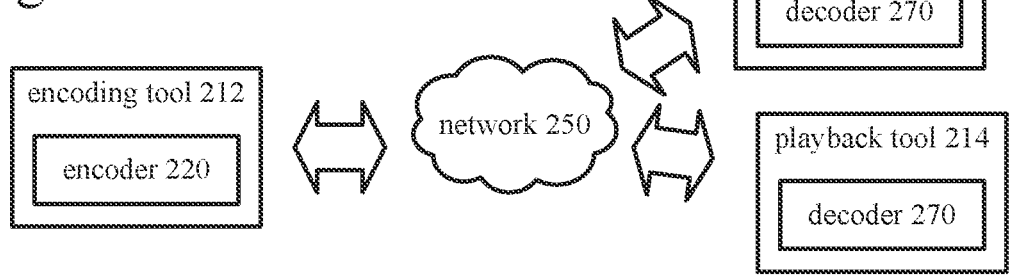

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO/IEC 14496-10 standard (also known as H.264 or AVC), HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
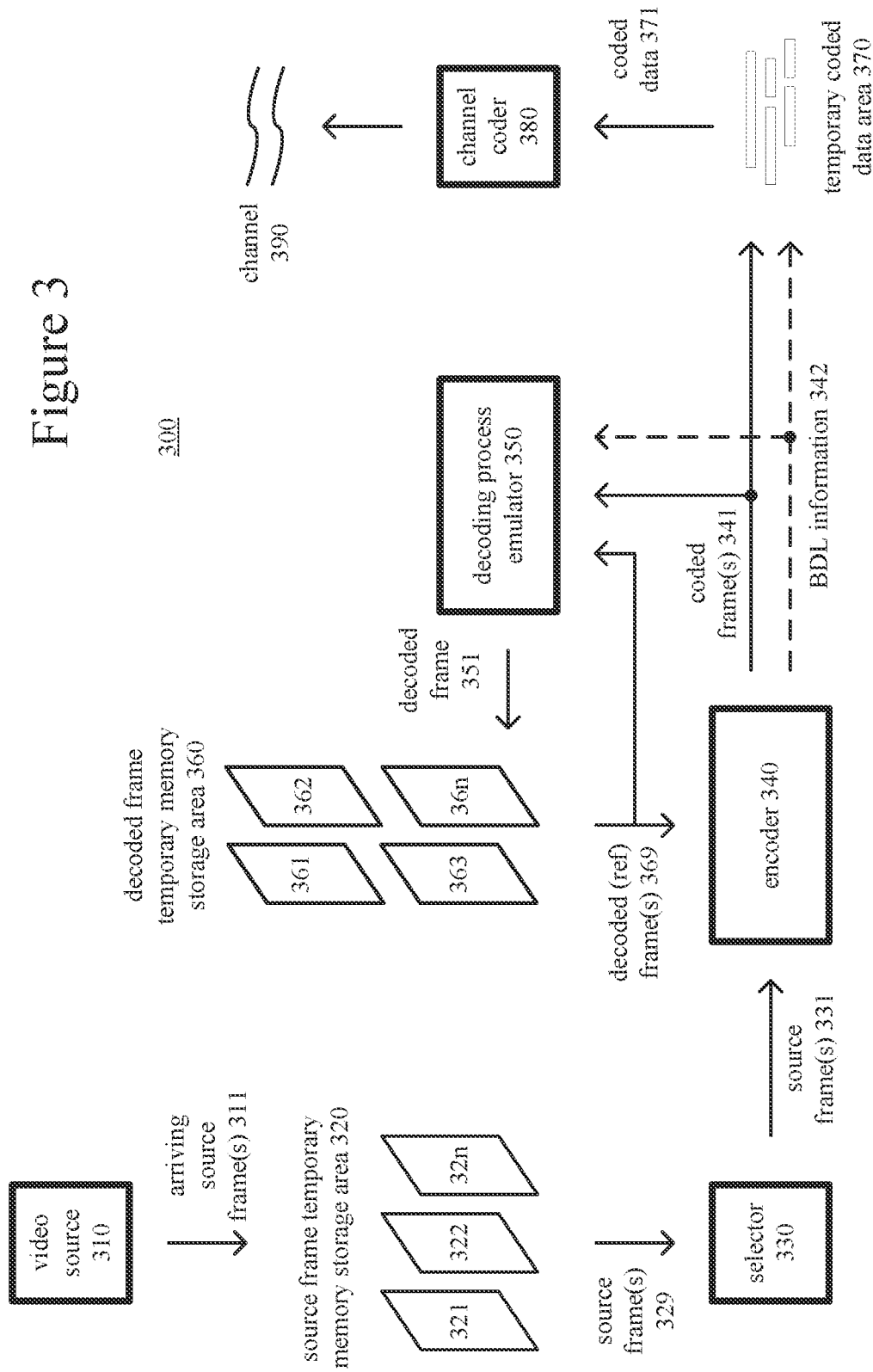
FIG. 3 is a diagram of an example encoder system in conjunction with which some described embodiments can be implemented.
Figure 5:
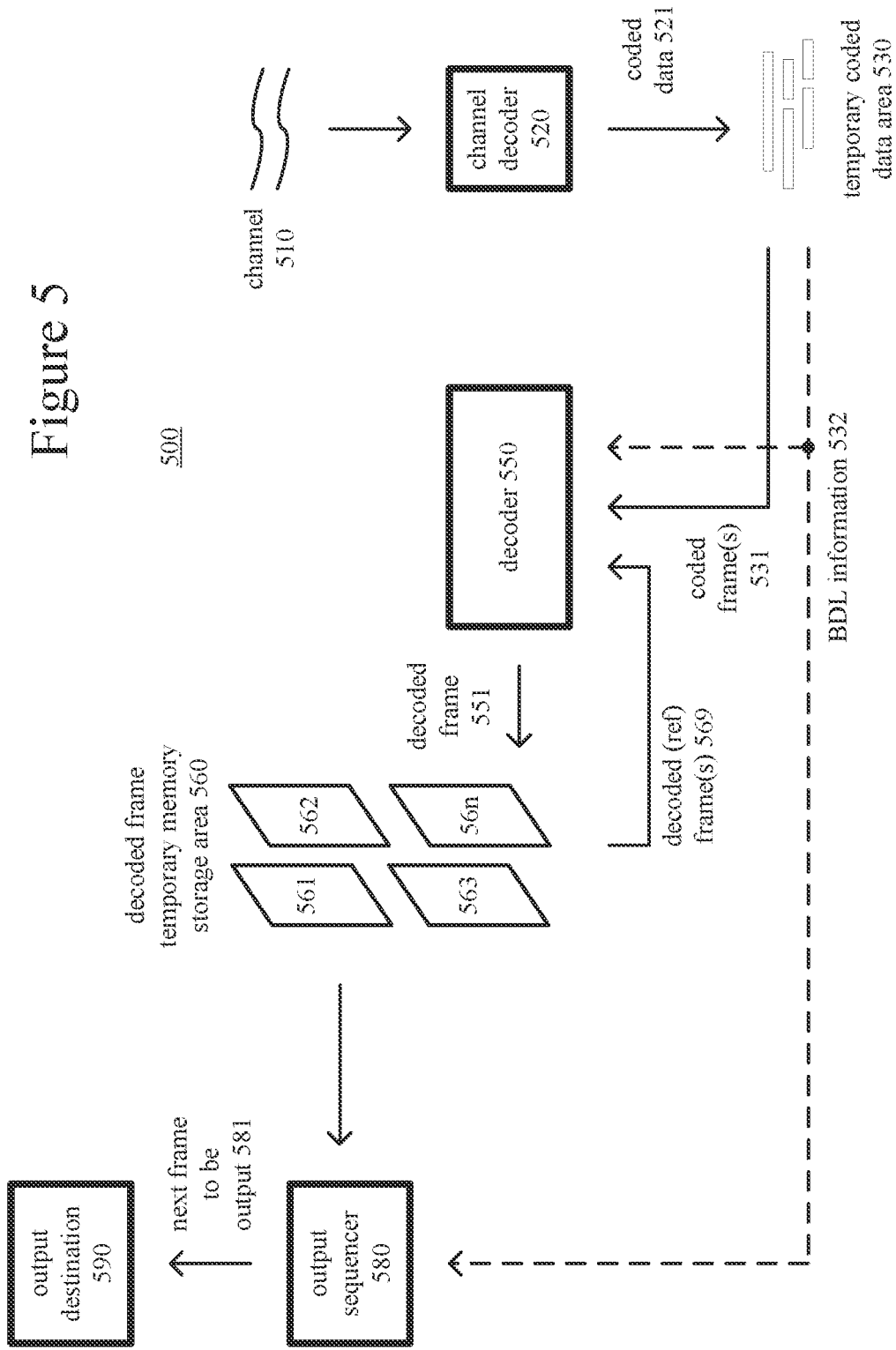
FIG. 5 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 5 shows an example decoder system (500), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214) and/or network video transmission tools. FIG. 5 shows an example decoder system (500), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include one or more syntax elements as described in Section V.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding.

The encoder (340) encodes the selected frame (331) to produce a coded frame (341) and also produces memory management control signals (342). If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format.

The coded frames (341) and BDL information (342) are processed by a decoding process emulator (350). The decoding process emulator (350) implements some of the functionality of a decoder, for example, decoding tasks to reconstruct reference frames that are used by the encoder (340) in motion estimation and compensation. The decoding process emulator (350) uses the BDL information (342) to determine whether a given coded frame (341) needs to be reconstructed and stored for use as a reference frame in inter-frame prediction of subsequent frames to be encoded. If the BDL information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362 . . . , 36n). The decoding process emulator (350) uses the BDL information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and BDL information (342) are also buffered in a temporary coded data area (370). The coded data that is aggregated in the coded data area (370) can contain, as part of the syntax of an elementary coded video bitstream, one or more syntax elements as described in Section V. Alternatively, the coded data that is aggregated in the coded data area (370) can include syntax element(s) such as those described in Section V as part of media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream, in which case the channel encoder (380) can in some cases add, as part of the syntax of the media transmission stream, syntax element(s) such as those described in Section V. Or, the channel encoder (380) can organize the aggregated data for storage as a file, in which case the channel encoder (380) can in some cases add, as part of the syntax of the media storage file, syntax element(s) such as those described in Section V. Or, more generally, the channel encoder (380) can implement one or more media system multiplexing protocols or transport protocols, in which case the channel encoder (380) can in some cases add, as part of the syntax of the protocol(s), syntax element(s) such as those described in Section V. The channel encoder (380) provides output to a channel (390), which represents storage, a communications connection, or another channel for the output.

Figure 4A:
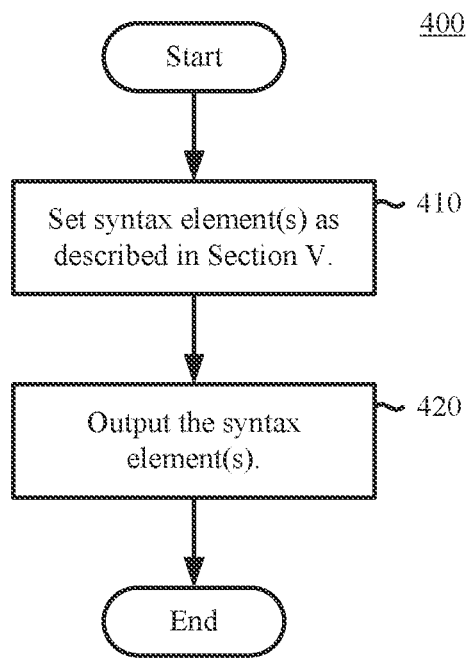
FIG. 4a is a flowchart of a generalized technique for outputting a syntax element as described herein.

FIG. 4a shows an example technique (400) for setting and outputting one or more syntax elements as described in Section V. For example, a real-time communication tool or encoding tool described with reference to FIGS. 2a and 2b performs the technique (400). Alternatively, another tool performs the technique (400). To start, the tool sets (410) one or syntax elements as described in Section V. The tool then outputs (420) the one or more syntax element(s).

Figure 4B:
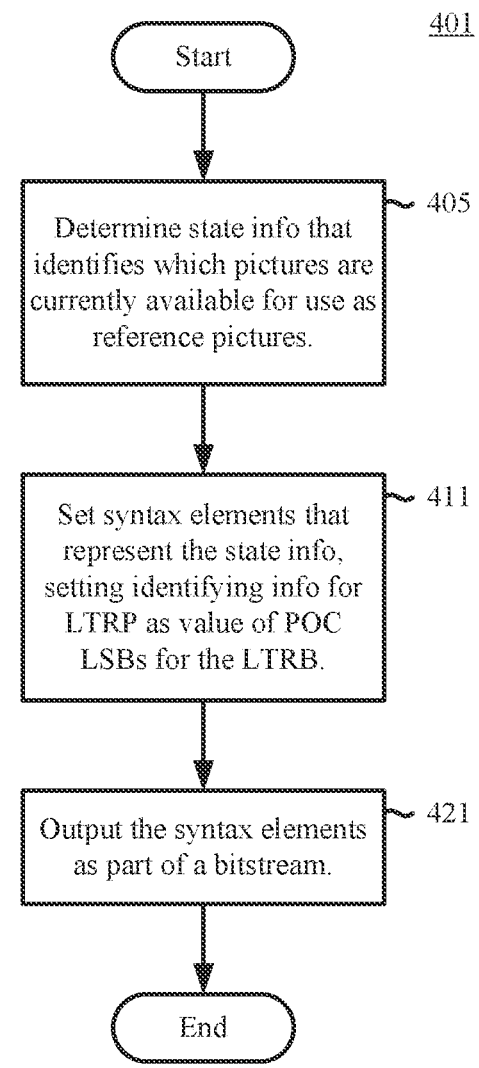
FIG. 4b is a flowchart of an example technique for signaling identifying information for LTRPs in a bitstream.

FIG. 4b shows a specific example (401) of the technique (400), focusing on signaling of identifying information for long-term reference pictures ("LTRPs"). For example, a real-time communication tool or encoding tool described with reference to FIGS. 2a and 2b performs the technique (401). Alternatively, another tool performs the technique (401).

To start, the tool determines (405) state information that identifies which pictures are available for use as reference pictures (that is, currently available to the video encoder for use as reference pictures; expected to be available to a video decoder for use as reference pictures at this point in decoding). The tool then sets (411) syntax elements that represent the state information. In particular, the tool sets identifying information for a LTRP. The identifying information for the LTRP is a value of picture order count least significant bits ("POC LSBs") for the LTRB. The pictures available for use as reference pictures can also include a short term reference picture ("STRP"). In this case, the tool can reuse the value of POC LSBs for the LTRB as a value of POC LSBs for the STRB, but mark the LTRB as used for long-term reference to distinguish between the LTRP and the STRP.

The syntax elements that are signaled in the bitstream can include other and/or additional syntax elements. For example, the tool determines whether to include status information about LTRPs in the bitstream for pictures of a sequence, and outputs, as part of a sequence parameter set, a flag that indicates whether the status information about LTRPs is present in the bitstream for the pictures of the sequence. Or, the tool sets a number of bits for POC LSBs to use for values of POC LSBs for LTRBs, then outputs a syntax element that indicates the number of bits for POC LSBs (e.g., a syntax element that represents the base-2 logarithm of a wrapping point for POC LSBs relative to a constant value, such as a log 2_max_pic_order_cnt_lsb_minus4 syntax element). Or, the tool uses and signals other syntax elements described in section V.

The tool then outputs (421) the syntax elements as part of a bitstream. For example, the tool signals the syntax elements in an elementary coded video bitstream for a current picture. Alternatively, the syntax elements are signaled at some other level of bitstream syntax.

IV. Example Decoder Systems.

FIG. 5 is a block diagram of an example decoder system (500) in conjunction with which some described embodiments may be implemented. The decoder system (500) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (500) can be implemented as an operating system module, as part of an application library or as a standalone application. Overall, the decoder system (500) receives coded data from a channel (510) and produces reconstructed frames as output for an output destination (590). The coded data can include one or more syntax elements as described in Section V.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes data that has been aggregated for transmission as a media stream, in which case the channel decoder (520) can parse, as part of the syntax of the media transmission stream, syntax element(s) such as those described in Section V. Or, the channel decoder (520) separates coded video data that has been aggregated for storage as a file, in which case the channel decoder (520) can parse, as part of the syntax of the media storage file, syntax element(s) such as those described in Section V. Or, more generally, the channel decoder (520) can implement one or more media system demultiplexing protocols or transport protocols, in which case the channel decoder (520) can parse, as part of the syntax of the protocol(s), syntax element(s) such as those described in Section V.

The coded data (521) that is output from the channel decoder (520) is stored in a temporary coded data area (530) until a sufficient quantity of such data has been received. The coded data (521) includes coded frames (531) and BDL information (532). The coded data (521) in the coded data area (530) can contain, as part of the syntax of an elementary coded video bitstream, one or more syntax elements such as those in Section V. Or, the coded data (521) in the coded data area (530) can include syntax element(s) such as those described in Section V as part of media metadata relating to the encoded video data (e.g., as one or more parameters in one or more SEI messages or VUI messages). In general, the coded data area (530) temporarily stores coded data (521) until such coded data (521) is used by the decoder (550). At that point, coded data for a coded frame (531) and BDL information (532) are transferred from the coded data area (530) to the decoder (550). As decoding continues, new coded data is added to the coded data area (530) and the oldest coded data remaining in the coded data area (530) is transferred to the decoder (550).

The decoder (550) periodically decodes a coded frame (531) to produce a corresponding decoded frame (551). As appropriate, when performing its decoding process, the decoder (550) may use one or more previously decoded frames (569) as reference frames for inter-frame prediction. The decoder (550) reads such previously decoded frames (569) from a decoded frame temporary memory storage area (560). Generally, the decoder (550) includes multiple decoding modules that perform decoding tasks such as entropy decoding, inverse quantization, inverse frequency transforms and motion compensation. The exact operations performed by the decoder (550) can vary depending on compression format.

The decoded frame temporary memory storage area (560) includes multiple frame buffer storage areas (561, 562, . . . , 56n). The decoded frame storage area (560) is an example of a DPB. The decoder (550) uses the BDL information (532) to identify a frame buffer (561, 562, etc.) in which it can store a decoded frame (551). The decoder (550) stores the decoded frame (551) in that frame buffer.

An output sequencer (580) uses the BDL information (532) to identify when the next frame to be produced in output order is available in the decoded frame storage area (560). When the next frame (581) to be produced in output order is available in the decoded frame storage area (560), it is read by the output sequencer (580) and output to the output destination (590) (e.g., display). In general, the order in which frames are output from the decoded frame storage area (560) by the output sequencer (580) may differ from the order in which the frames are decoded by the decoder (550).

Figure 6A:
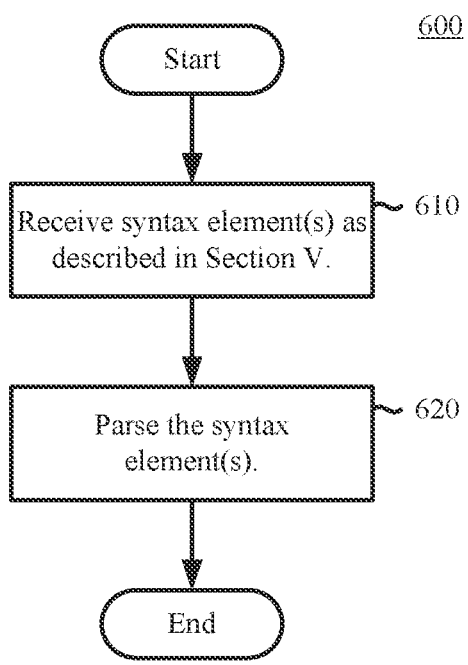
FIG. 6a is a flowchart of a generalized technique for parsing a syntax element as described herein.

FIG. 6a shows an example technique (600) for receiving and parsing syntax elements as described in Section V. For example, a real-time communication tool or playback tool described with reference to FIGS. 2a and 2b performs the technique (600). Alternatively, another tool performs the technique (600). To start, the tool receives (610) one or more syntax elements as described in Section V. The tool then parses (620) the one or more syntax elements. The tool can then use the syntax elements as explained in Section V.

Figure 6B:
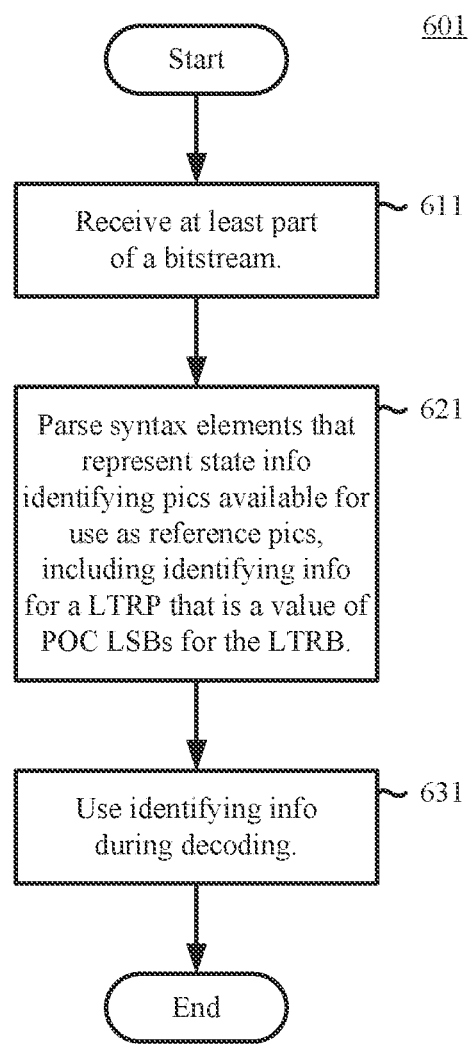
FIG. 6b is a flowchart of an example technique for parsing identifying information for LTRPs from a bitstream.

FIG. 6b shows a specific example (601) of the technique (600), focusing on parsing of identifying information for LTRPs. For example, a real-time communication tool or playback tool described with reference to FIGS. 2a and 2b performs the technique (601). Alternatively, another tool performs the technique (601).

To start, the tool receives (611) at least part of a bitstream. For example, the bitstream is an elementary coded video bitstream. The tool parses (621) syntax elements from the bitstream. The syntax elements represent state information that identifies which pictures are available for use as reference pictures (that is, currently available to a video encoder for use as reference pictures; expected to be available to the video decoder for use as reference pictures at this point in decoding). For example, the syntax elements that represent the state information are signaled in the bitstream for a current picture. Alternatively, the syntax elements are signaled at some other level of bitstream syntax.

In particular, the syntax elements include identifying information for a LTRP. The identifying information for the LTRP is a value of POC LSBs for the LTRB. The pictures available for use as reference pictures further can include a STRP. In this case, the tool can reuse the value of POC LSBs for the LTRB as a value of POC LSBs for the STRB, but mark the LTRB as used for long-term reference to distinguish between the LTRP and the STRP.

The syntax elements that are signaled in the bitstream can include other and/or additional syntax elements. For example, the tool parses, from a sequence parameter set, a flag that indicates whether status information about LTRPs is present in the bitstream for pictures of a sequence. Or, the tool parses a syntax element that indicates a number of bits for POC LSBs to use for values of POC LSBs for LTRBs, using the number of bits for POC LSBs when parsing the identifying information for the LTRP.

The tool uses (631) the identifying information during decoding. For example, the tool uses the state information to manage a decoded picture storage area of a video decoder as part of the decoding.

V. Innovations in Signaling State of a DBP and RPLs.

Various approaches have been presented for using BDL information in conjunction with the HEVC standard. One approach is described in the document JCTVC-F493, entitled "Absolute Signaling of Reference Pictures" and including "Proposed Changes to the HEVC Working Draft." Other approaches are described in JCTVC-F803_d1_Buffer_Descriptions_r0, entitled "WD4: Working Draft 4 of High-Efficiency Video Coding," and JCTVC-F803_d1_Buffer_Descriptions_display_process_suggestion_r1, also entitled "WD4: Working Draft 4 of High-Efficiency Video Coding." This section describes specific changes relative to approaches shown in the documentation for JCTVC-F803_d1. These changes extend some of the concepts proposed in JCTVC-F493. The different innovations described in this section can be used in combination or separately.

A. Future Reference Flag

According to one innovation described herein, an encoder and decoder use a future reference flag per reference picture of BDL information, where the future reference flag indicates whether the reference picture is only used for decoding of a current picture, or is used for decoding of at least one future picture in coded order. The future reference flag thus indicates whether the reference picture is retained after the current picture is decoded. In example implementations, the future reference flag is a new syntax element called mark_unused_after_decoding_flag that is added for each picture in the BDL. This syntax element permits utilization of full DPB size in conjunction with BDL information.

If the location of the reference picture marking operation is moved earlier in the decoding process, it can reduce the number of reference pictures that can be stored in the buffer. If the DPB capacity is N pictures and the current picture is a reference picture, then there will be no room to store the current picture in the buffer unless the total size of the BDL does not exceed N−1 pictures. That is one picture less than what is possible using the AVC syntax, because in the AVC syntax. (1) first the pictures that are in the buffer are referenced for the decoding process, (2) then any pictures that are no longer needed are discarded (that is, marked as "unused for reference," which makes room in the buffer for the new picture), and (3) then the current picture is stored in the buffer for potential use in the decoding process of subsequent pictures. By moving the marking process to before the use of the pictures as references, the number of pictures that can be referenced for a given total buffer capacity is reduced by 1. Decreasing the total buffer capacity is highly undesirable.

A future reference flag can be used to address this limitation on use of DPB capacity. In example implementations, a one-bit flag called mark_unused_after_decoding_flag is signaled in the BDL for each listed picture. The mark_unused_after_decoding_flag indicates whether the reference picture is used only for decoding of the current picture (associated with the BDL information) or also used for decoding of at least one later picture in coded order. If the reference picture is only used for decoding of the current picture, it can be overwritten with the decoded current picture. The marking of pictures with mark_unused_after_decoding_flag equal to 1 as "unused for reference" is performed after the decoding process of the current picture and before the storage of the current picture in the DPB. For example, if a DPB stores at most five reference pictures and is full, if one of the five reference pictures is not used for decoding of future pictures (as indicated with the mark_unused_after_decoding_flag), that reference picture can be overwritten with the decoded current picture. In this way, the total buffer capacity of the DPB can be used—the encoder and decoder need not reserve an empty spot in the DPB for the decoded current picture.

B. On/Off Decision Flag for Future Reference Flags

According to another innovation described herein, an on/off decision flag is signaled for future reference flags. An encoder may not want to make use of future reference flags. To avoid sending unnecessary bits, an encoder can use an on/off decision flag for future reference flags. If the on/off decision flag is "on," then future reference flags are used. Otherwise, if the on/off decision flag is "off," then future reference flags are not used.

For example, in example implementations, some encoders may not want to make use of the mark_unused_after_decoding_flag. To avoid sending unnecessary bits by such encoders, a flag is added at the SPS level called the no_final_referencing_flag. When no_final_referencing_flag is equal to 1, the mark_unused_after_decoding_flag syntax element are omitted from the bitstream. In this case, the decoder does not receive, parse, use etc. mark_unused_after_decoding_flag syntax elements. Otherwise, the decoder receives, parses, uses etc. mark_unused_after_decoding_flag syntax elements.

C. Marking Pictures of Lower Temporal Layers

According to another innovation described herein, in BDL information for a picture associated with a higher temporal layer, reference picture marking information can mark one or more pictures in a lower temporal layer as being unused for reference. In some scenarios, it may be useful to permit such options for reference picture management for pictures in a higher temporal layer. And, when later BDL information lacks status information for reference pictures previously removed with BDL information for a picture at the higher temporal layer, the decoder can infer the removal of such reference pictures.

In some approaches to signaling state of a DPB, pictures in higher temporal layers are prohibited from marking pictures in lower temporal layers as "unused for reference." When using BDL-type syntax as described herein, however, such prohibitions do not make sense. Once a picture has been omitted from a BDL, it does not appear in any subsequent BDL either, so there is no danger of the decoder missing the notification to mark the picture as "unused for reference."

D. Higher Layer Picture Designation Flag

According to another innovation described herein, an encoder and decoder use a higher layer picture designation flag per picture of a higher temporal layer in BDL information, where the higher layer picture designation flag designates a picture as relating to a higher temporal layer for purposes of the BDL information. In many scenarios, pictures of a higher temporal layer are not used as reference pictures. The process of managing and updating the DPB can be simplified for such pictures. Where BDL information is used at all for pictures of a higher temporal layer, a simple flag per picture in the BDL information can suffice to designate the picture as being associated with a higher temporal layer, where the actions of managing and updating the DPB are implied.

In example implementations, a simple higher_layer_picture_flag can be sent for each picture in the BDL to indicate whether or not the picture is in a higher temporal layer. In some scenarios, it may be desirable to include information for pictures in higher temporal layers in BDL information, in order to be able to expressly indicate that some such pictures are to be marked as "unused for reference." Even if these pictures are listed in DBL information, however, sending details such as actual layer number is not necessary. Instead, a simple higher_layer_picture_flag is sent for each picture in the BDL to indicate whether or not the picture is in a higher temporal layer. When higher_layers_not_listed_flag is equal to 1, any pictures in higher temporal layers are proposed to remain unaffected by the decoding process of the current picture—simply retaining their existing marking status.

E. On/Off Decision Flag for Higher Layer Picture Designation Flags

According to another innovation described herein, an encoder and decoder use an on/off decision flag for including status information about pictures of higher temporal layers in BDL information. For example, the on/off decision flag can be signaled as part of a SPS and indicate presence/absence of status information about pictures of higher temporal layers in BDL information.

In example implementations, a flag called the higher_layers_not_listed_flag is added at the SPS level. When the flag is equal to 1, pictures of higher temporal layers are not included in the BDLs of the CVS. In prior proposals, pictures of higher temporal layers are included in the BDLs. Such pictures are never actually referenced in the decoding process of a current picture, and this is known by the decoder. Since these pictures are irrelevant to the decoding of the current picture and any subsequent pictures in the current temporal layer and any lower temporal layer, there is questionable value to having them included in the BDL in many use cases, and therefore it is desirable to avoid burdening the syntax with this extra data that is irrelevant to the decoding process of the layers being decoded.

F. BDL Information at APS Level

According to another innovation described herein, BDL information is signaled at adaptive slice parameter set ("APS") level. A single set of BDL information is associated with an APS.

The idea of having multiple buffer lists in the parameter set is not elegant, and not necessary. The multiple-list concept with an index to identify the selected BDL is something of a new hybrid level of syntax that seems unnecessarily complicated and anticipates an encoder design that pre-plans its BDL structures in advance in a way that seems unnecessary. Also, with the BDL residing in the APS, there may be no need for the ability to override the APS-level BDL in the slice header level. Thus, absent appropriate justification. BDL information is signaled only at the APS level or higher.

G. Simplified Syntax for LTRPs in BDL Information

According to another innovation described herein, an encoder and decoder use status information for LTRPs in BDL information. LTRPs provide a useful design element for video encoding and decoding. Managing and updating LTRPs in BDL information presents challenges, however. Various versions of simplified syntax for LTRPs in BDL information are proposed herein, which reduce bitrate for LTRP status information and simplify DPB management.

LTRPs are a useful design element that is actually used in some products, especially for robust real-time communication. Aspects of LTRPs as found in AVC include not only the ability to keep a picture in the DPB for a long time, but also the use of a different treatment for motion vector scaling and weighted prediction computations.

In example implementations, LTRP functionality is retained and DBL information accounts for LTRP management. Some existing approaches to signaling LTRP status information in BDL information are overly elaborate, in that they involve an entirely separate listing of LTRPs and signaling of total POC differences, which is not appropriate. For example, an LTRP is identified by its total POC difference. For an LTRP that has remained in the DPB for a very long time, the length of the codeword needed for sending its POC difference could become extremely large—wasting bits and causing decoder parsing problems and ultimately limiting the duration for which an LTRP can be retained when using the syntax.

In contrast, in example implementations, an encoder and decoder use BDL information with a simplified syntax for LTRP status information, in which only the difference between least significant bits ("LSBs") of the POC values, modulo the most significant bit ("MSB") wrapping point, is sent to identify an LTRP, rather than the complete POC difference. There is no real need to track the MSB values of POC values—only the relative order is really necessary to be established, and avoiding the specification of MSB tracking may ease interpretation for such intended functionality as random-access decoding. Also, by avoiding representation of the MSBs of the difference, the POC difference sent to identify an LTRP would not need to grow larger and larger over time. With appropriate design choices, the encoder need not even be concerned about the case of sending a new picture that reuses the same POC LSBs that are used by an existing LTRP.

Below are two possible approaches within this spirit. Both involve sending, for each picture in the BDL information, a long_term_reference_flag syntax element. The second approach (Scheme B below) is somewhat simpler. The first approach (Scheme A below) enables more encoder flexibility.

According to Scheme A, when the value of the long_term_reference_flag syntax element changes from 0 to 1 for a given value of POC LSBs, this marks the picture as "used for long-term reference" as in AVC. The same POC LSB value can again be used for a short-term reference picture later with no confusion. For the same POC LSBs, the picture with the long_term_reference_flag equal to 1 remains distinctly identified compared to the picture with long_term_reference_flag equal to 0. Only after marking the LTRP as "unused for reference" would the encoder (or decoder) be able to replace it with another LTRP with the same POC LSB value.

For Scheme A, pathological and transition cases involving LTRPs and short-term reference pictures (STRPs) are handled as follows:

If, prior to decoding a new picture, the buffer contains only an STRP for some value of POC LSBs, and then BDL information is received that contains only an LTRP for that value, the STRP is marked as "used for long-term reference" prior to decoding the current picture.

If, prior to decoding a new picture, the buffer contains only an LTRP for some value of POC LSBs, and then BDL information is received that contains only an STRP for that value, the bitstream is illegal.

If, prior to decoding a new picture, the buffer contains both an LTRP and STRP for the same POC LSB values, and then BDL information is received that contains only an STRP for that value, the LTRP is marked as "unused for reference."

If, prior to decoding a new picture, the buffer contains both an LTRP and STRP for the same POC LSB values, and then BDL information is received that contains only an LTRP for that value, the STRP is marked as "unused for reference."

According to Scheme B, a picture is marked as "used for long-term reference" only by setting a flag that is sent when it is decoded (e.g., a flag called used_for_long_term_flag). All subsequent inclusions of that picture in BDL information have long_term_reference_flag equal to 1, and the value of long_term_reference_flag would be used to distinguish between the LTRP and any hypothetical short-term reference picture that has the same POC LSB value.

H. On/Off Decision Flag for LTRP Flags

According to another innovation described herein, an encoder and decoder use an on/off decision for flag for including status information about LTRPs in BDL information. For example, the on/off decision flag is signaled as part of a SPS and indicate presence/absence of status information about LTRPs in BDL information Since some encoders may not wish to make use of LTRPs, in example implementations, a flag is sent at the SPS level called the no_long_term_pictures_flag. When that flag is zero, the long_term_reference_flag values (and, in the case of Scheme B above, the used_for_long_term_flag) are not present in the syntax I. Reducing Bits Used for LTRP Identifying Information According to another innovation described herein, the number of bits used to identify LTRPs in BDL information is reduced. In many use scenarios, the number of LTRPs is small, and a small number of bits suffices to identify LTRPs. An encoder can increase the number of bits used to identify LTRPs for other use scenarios.

In example implementations, for Scheme A or B, the syntax can become even more efficient in cases where the number of POC LSBs that is sent is small. For example, if the number of bits for POC LSBs to be sent is 4 (as with log 2_max_pic_order_cnt_lsb_minus4 in AVC POC type 0), rather than some larger number such as 8, the bitrate associated with LTRB-identifying information in the BDL information can be reduced. Using a larger number of bits than 4 may be an unnecessary burden in many use scenarios. In scenarios where a larger number of bits is appropriate, however, an encoder can simply use a larger value of log 2_max_pic_order_cnt_lsb_minus4 (or its equivalent).

J. Efficient Organization of BDL Information

According to another innovation described herein, BDL information is organized and sent in the order used for construction of an RPL. This simplifies syntax for purposes of RPL construction.

In example implementations, since the BDL information itself is a list of pictures, it can potentially be sent in the order needed for direct construction of list 0 from the first listed pictures of the transmitted list. If the pictures are listed in the list 0 order, there is no real need for reference picture list modification syntax for list 0.

K. Signaling Whether Gaps Allowed for POC Values

According to another innovation described herein, an encoder signals whether gaps in POC values are permitted. If gaps are not permitted, a decoder can recognize picture losses when it determines POC values are missing, and a decoder can make decisions about pictures being ready for output based on POC values.

In example implementations, a flag called poc_gaps_allowed_flag is sent at SPS level. When this flag is equal to 0, all consecutive pictures in output order have consecutive POC LSB values, with no gaps. Thus, a decoder can recognize picture losses by recognizing missing POC values. Also, use of poc_gaps_allowed_flag syntax elements by an encoder would enable decoders to recognize strings of pictures that are ready for output from an output-order conforming decoder. If a picture with some POC value K has already been output, and a picture with POC value K+1 is present in the DPB, the decoder will be able to detect that this picture with POC LSB value K+1 will be the next picture to be output. And, if no such picture with POC LSB value K+1 is present in the DPB, the decoder will know that some later picture will arrive with that POC LSB value, unless something has gone wrong.

L. Entropy Coding and Decoding of Syntax Elements for BDL Information

According to another innovation described herein, syntax elements in BDL information can be encoded using truncated Exp-Golomb coding (that is, te(v)) instead of unsigned Exp-Golomb coding. Various syntax elements for BDL information have been proposed to be sent as ue(v) encoded values. Often, the number of choices available for these syntax elements is small. Thus, encoding such syntax elements as te(v) values can improve efficiency. A decoder performs corresponding entropy decoding.

VI. Additional Innovations in Signaling State of a DBP and RPLs.

In some implementations, a video encoder and video decoder can follow additional constraints to simplify and improve the robustness of POC computation. With or without such constraints, in various use scenarios, a video encoder and video decoder can use signaled state information that identifies which pictures are available for use as reference pictures.

A. First Approaches to Improving Robustness of POC Computation.

In a first set of example approaches, a constraint is introduced that all pictures that are used as references or are waiting for output have relative POC positions that can be computed unambiguously relative to the POC of the current picture, his addresses potential robustness problems in the way MSBs of POC values are tracked.

For example, suppose the POC wrap value is 16 (and the DPB size is large enough for picture output to be delayed, and all pictures are reference pictures). If the POC LSB values for consecutive pictures in decoding order are 5, 11, 2, then when the picture with POC LSB value 2 is decoded, the position of the picture with POC LSB value 5 is ambiguous relative to the current picture with POC LSB value 2. If the picture with POC LSB value 11 is lost, the other two pictures will be output in the wrong relative order. (Also, the temporal scaling of motion vectors will be incorrect, the reference picture list construction will be wrong, and temporal weighted prediction will become incorrect.)

By imposing the constraint and referencing all relative POC values to the POC value for the current picture, the need to track actual POC MSBs for the pictures in the buffer is eliminated. In this approach, relative POC positions remain correct for as long as the pictures stay in the buffer. This alleviates some concerns about problems that can occur when using a small number of LSBs for POC, but it solves the problem in a more complete manner than by mandating a larger minimum number of POC LSBs.

B. Second Approaches to Improving Robustness of POC Computation.

When a decoder infers MSB values for the POC associated with each decoded picture, there can be several problems. MSB values are inferred from the history of the decoding process from picture-to-picture, throughout the entire coded video sequence, and the removal of one or more pictures from the bitstream can result in corruption of MSB values. This in turn can cause out-of-order playback of the remaining pictures, incorrect reference picture list construction, and incorrect temporal weighted prediction. Specification of MSB values by inference can also pose difficulties for random access, since a decoder that performs random access into the bitstream does not have access to the preceding pictures in the coded video sequence.

In a second set of example approaches, similar to the first set of example approaches, a constraint on relative POC computation is introduced on the values of the POC LSBs of the pictures in the bitstream (where POC LSB values are expressed by the pic_order_cnt_lsb syntax element). Following this constraint can have a negligible effect on coding efficiency, simplify the decoding process for establishing relative POC order, eliminate the need for inference of POC MSB values, and improve robustness to picture losses. Thus, to address the robustness problem and eliminate the need to track actual POC MSB values, a constraint is introduced that all pictures that are used as references or are waiting for output have relative POC positions that can be computed unambiguously relative to the POC of the current picture.

For example, suppose the number of POC LSBs that are sent is 4, and therefore the POC wrap value is 16 (and the DPB size is large enough for picture output to be delayed, and all pictures are reference pictures). If the POC LSB values for consecutive pictures in decoding order are 5, 11, 2, then when the picture with POC LSB value 2 is decoded, the position of the picture with POC LSB value 5 can become ambiguous relative to the current picture with POC LSB value 2. If the picture with POC LSB value 11 is lost, the other two pictures will be output in the wrong relative order, the temporal scaling of motion vectors will be incorrect, the reference picture list construction will be wrong, and temporal weighted prediction will become incorrect.

By imposing the constraint and referencing all relative POC values to the POC LSB value for the current picture, the need to track actual POC MSBs for the pictures in the buffer is eliminated. In this approach, relative POC positions remain correct for as long as the pictures stay in the buffer for purposes of short-term referencing or output ordering. This alleviate some concerns about problems that can occur when using a small number of LSBs for POC, but it solves the problem in a more complete manner than by mandating a larger minimum number of POC LSBs.

In combination with this constraint for relative POC computation, or in combination with another approach to computing POC values, an encoder can apply a constraint on range of POC values. For example, the encoder sets POC values during encoding such that the range of POC values (difference between maximum and minimum, for a given picture and its reference pictures) is limited by a threshold that depends on the maximum value possible for POC LSBs. Examples of this constraint are described below.

A real-time communication tool or encoding tool described with reference to FIGS. 2a and 2b can perform encoding subject to one or both of these constraints on POC values. Alternatively, another tool performs the technique.

To start, the tool sets POC values for pictures subject to the constraint(s). For example, a constraint limits the range of POC LSB values for a current picture and its reference pictures, as described below. The tool then encodes video for the pictures, producing a conformant bitstream. In the bitstream, the tool can signal the POC values (e.g., using syntax elements that indicate POC LSBs) that are consistent with the constraint(s) applied.

1. Example Approach Without Relative POC Computation

In an example approach without relative POC computation, POC values are decoded as follows. The output of this process is PicOrderCntVal, the POC of the current picture. POCs are used to identify pictures, for deriving motion parameters in temporal or spatial direct mode, to represent picture order differences between frames for motion vector derivation, for implicit mode weighted prediction in B slices, and for decoder conformance checking. Each coded picture is associated with one POC, called PicOrderCntVal, which indicates the picture order of the corresponding picture relative to the previous IDR picture in decoding order.

The variables prevPicOrderCntLsb and prevPicOrderCntMsb are derived as follows. If the current picture is an IDR picture, both prevPicOrderCntLsb and prevPicOrderCntMsb are set equal to 0. Otherwise (the current picture is not an IDR picture): (a) let prevRefPic be the previous reference picture in decoding order that has temporal_id equal to 0; (b) the variable prevPicOrderCntLsb is set equal to pic_order_cnt_lsb of prevRefPic, and the variable prevPicOrderCntMsb is set equal to PicOrderCntMsb of prevRefPic.

The PicOrderCntMsb of the current picture is derived as specified by the pseudo-code listing (700) shown in FIG. 7a. Alternatively, equivalent logic can be used to determine PicOrderCntMsb of the current picture. Then, the value of PicOrderCntVal is derived as:

PicOrderCntVal=PicOrderCntMsb+pic_order_cnt_lsb

In the example approach, IDR pictures have PicOrderCntVal equal to 0 since pic_order_cnt_lsb is inferred to be 0 for IDR pictures and prevPicOrderCntLsb and prevPicOrderCntMsb are both set equal to 0. In a given coded video sequence, the PicOrderCntVal values for any two coded pictures shall be different.

In combination with the example approach, the encoder can apply a constraint on range of POC values. For example, the encoder sets POC values during encoding such that the range of POC values (difference between maximum and minimum, for a given picture and its reference pictures) is limited by a threshold that depends on the maximum value possible for POC LSBs.

2. Example Approach with Relative POC Computation

In another example approach, POC values are decoded as follows. The output of the process is a PicOrderCntVal for the current picture and for each picture in the DPB that is marked as "used for short-term reference" or "needed for output." POCs are used to identify pictures, for deriving motion parameters in temporal or spatial direct mode, to represent picture order differences between frames for motion vector derivation, for implicit mode weighted prediction in B slices, and for decoder conformance checking.

The variable currPicOrderCntLsb is set to the value of the pic_order_cnt_lsb syntax element associated with the current picture. For the current picture and for each picture in the DPB that is currently marked as "used for short-term reference" or "needed for output," the associated variable thatPicOrderCntLsb is set to the value of pic_order_cnt_lsb syntax element associated with that picture, and the associated variable PicOrderCntVal is set as shown in the pseudo-code listing (701) shown in FIG. 7b.

The variable maxPicOrderCnt is set equal to the maximum value of PicOrderCntVal among the associated values for the current picture and all pictures in the DPB that are currently marked as "used for short-term reference" or "needed for output." The variable minPicOrderCnt is set equal to the minimum value of PicOrderCntVal among the associated values for the current picture and all pictures in the DPB that are currently marked as "used for short-term reference" or "needed for output." The constraint in this approach depends on the variables maxPicOrderCnt and minPicOrderCnt, considering the maximum value possible for POC LSBs. For example, it is a requirement of bitstream conformance that the value of maxPicOrderCnt−minPicOrderCnt shall be less than MaxPicOrderCntLsb/2. Alternatively, the constraint is implemented in some other form such that the range of POC values (difference between maximum and minimum) is limited by a threshold that depends on the maximum value possible for POC LSBs.

The function PicOrderCnt(picX) is specified as PicOrderCnt(picX)=PicOrderCntVal of the picture picX. The function DiffPicOrderCnt(picA, picB) is specified as DiffPicOrderCnt(picA, picB)=PicOrderCnt(picA)−PicOrderCnt(picB). For example, let picX be the current picture and picY and picZ be two other pictures in the same sequence; picY and picZ are considered to be in the same output order direction relative to picX when DiffPicOrderCnt(picX, picY) and DiffPicOrderCnt(picX, picZ) are both positive or are both negative. Many encoders assign pic_order_cnt_lsb syntax element values such that values of DiffPicOrderCnt (picA, picB) that are used in the decoding process are (precisely or approximately) proportional to the time differences between the sampling times of the associated pictures picA and picB.

In this example approach, the value of PicOrderCntVal has no dependencies on the syntax or decoding process of any data in the bitstream below the SPS level, other than the pic_order_cnt_lsb of the current picture and the pic_order_cnt_lsb of the respective picture(s) associated with the PicOrderCntVal variable(s). Also, there is no need to impose a constraint on the range of PicOrderCntVal, since it naturally has a limited range (within the range of −MaxPicOrderCntLsb to 2*MaxPicOrderCntLsb).

C. Use Scenarios.

In various use scenarios, a video encoder and video decoder can use signaled state information that identifies which pictures are available for use as reference pictures. For unidirectional communication, as generally described with reference to FIG. 2b, a video encoder can provide encoded video in a video surveillance system, web camera monitoring system, remote desktop conferencing presentation or other scenario. For bi-directional communication, as generally described with reference to FIG. 2a, a video encoder can provide encoded video for a video conference, video telephone call, or other two-party communication scenario.

The video encoder can select one or more LTRPs that depict elements of a scene that recur in a video sequence. For example, for a video surveillance system or web camera monitoring system, the video encoder selects one or more LTRPs that depict background elements of a scene, which consistently appear throughout a sequence. Or, for a remote desktop conferencing presentation, the video encoder selects one or more LTRPs that depict elements of a desktop user interface or application software. Or, for a video conference or video telephone call, the video encoder selects one or more LTRPs that depict background elements of a scene or relatively static elements of a participant (e.g., features of a seated person). During encoding, the video encoder can determine which LTRPs to retain as available reference pictures based on the frequency that the LTRPs are used for motion compensation, which LTRPs were successfully reconstructed by a video decoder and/or other factors.

A video encoder can periodically reset LTRPs to facilitate playback if a client computing device switches streams (e.g., after a channel change to a different stream, or after a switch to a stream of the same sequence at a different bitrate/quality). Such periodic resetting of LTRPs can also help a client computing device recover from packet loss or corruption that may prevent a video decoder from having the reference pictures it is supposed to have for correct decoding. When it resets LTRPs, the video encoder may use intra-coded pictures, which can help provide random access and recovery functionality, but also tend to have higher bitrate than motion-compensated pictures.

In real-time video communication scenarios (e.g., video conference, video telephone call, remote desktop conferencing presentation), a video encoder and video decoder can interact to facilitate error recovery and error concealment with faster recovery and improved coding efficiency. For example, at a server computing device, the video encoder determines state information that identifies which pictures are available for use as reference pictures at the video encoder. (Such pictures are also expected to be available for use as reference pictures by the video decoder, when decoding reaches this point, assuming packet loss or corruption does not adversely affect reconstruction for any of the reference pictures.) Then, the server computing device sets syntax elements that represent the state information and outputs the syntax elements.

At a client computing device, the video decoder receives and parses the syntax elements that represent the state information identifying which pictures are available for use as reference pictures at the video encoder (which are also expected to be available for use as reference pictures by the video decoder, when decoding reaches this point). The decoder can use the state information during decoding to determine reference picture sets. Or, the decoder can use the state information to initiate error recovery or concealment operations. Packet loss or corruption may have prevented the correct reconstruction of one or more of the indicated reference pictures by the video decoder. The video decoder determines state information (which can be termed new state information, decoder state information, etc.) that identifies which pictures are actually available for use as reference pictures by the video decoder. The video decoder sets syntax elements for feedback information that represents the decoder state information. The video decoder sends the feedback information, for the video encoder to use during subsequent encoding. This permits the video encoder to determine which pictures are actually available for reference at the video decoder, using the previously signaled state information as well as the feedback information from the video decoder.

At the server computing device, the video encoder receives the feedback information that represents the decoder state information and uses the feedback information during encoding. For example, the video encoder uses the feedback information to remove one or more LTRPs that the video decoder did not correctly reconstruct. Or, the video encoder otherwise uses the feedback information when deciding how to encode one or more next pictures relative to LTRPs that the feedback information confirms to be available at the video decoder. The video encoder determines state information consistent with the feedback information, sets syntax elements that represent the state information, and outputs those syntax elements in the bit stream. In this way, the video encoder can help the video decoder recover from packet loss or corruption more quickly, in a way that is conformant to basic encoding and decoding features, with high coding efficiency due to use of LTRPs.

The video decoder can provide the feedback information to the video encoder periodically (e.g., for each picture, for each group of x pictures). Or, the video decoder can provide the feedback information on demand (e.g., when the video decoder identifies a discrepancy between received state information and reference pictures that are actually available to the video decoder). The video decoder can provide the feedback information in a separate feedback channel or, for bi-directional communication, multiplexed with encoded video data in an outgoing media stream.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements a video encoder, a method comprising:
   determining to include long-term reference picture ("LTRP") status information in a bitstream for pictures of a sequence;
   outputting, as part of a sequence parameter set, a flag that indicates LTRP status information is present in the bitstream for the pictures of the sequence;
   encoding a current picture among the pictures of the sequence, thereby producing coded data, including:
      determining a set of reference pictures available for the current picture, the set of reference pictures including at least one LTRP;
      determining LTRP status information for the current picture, wherein the LTRP status information for the current picture identifies which pictures, if any, among the set of reference pictures are available for use as LTRPs for the current picture; and
      setting syntax elements that represent the LTRP status information for the current picture, including setting identifying information for a given LTRP in the LTRP status information for the current picture, wherein the identifying information for the given LTRP is a value of picture order count least significant bits ("POC LSBs") for the given LTRP for the current picture, the value of the POC LSBs for the given LTRP, modulo a most significant bit wrapping point, at least in part indicating a difference between POC values of the current picture and the given LTRP; and
   outputting the coded data as part of the bitstream, the coded data including the syntax elements that represent the LTRP status information for the current picture.

2. The method of claim 1, wherein the syntax elements that represent the LTRP status information for the current picture are signaled in the bitstream for the current picture.

3. The method of claim 1, wherein the setting the syntax elements that represent the LTRP status information for the current picture further includes:

setting a flag for the given LTRP in the LTRP status information for the current picture, the flag for the given LTRP indicating whether the given LTRP is used for decoding of the current picture.

4. The method of claim 1, wherein the setting the syntax elements that represent the LTRP status information for the current picture further includes:

setting a flag for the given LTRP in the LTRP status information for the current picture, wherein the flag for the given LTRP facilitates reuse of the value of POC LSBs for the given LTRP as a value of POC LSBs for another reference picture while the given LTRP remains distinctly identified compared to the other reference picture.

5. The method of claim 1, further comprising:

reusing the value of POC LSBs for the given LTRP as a value of POC LSBs for another reference picture, wherein the other reference picture is a short-term reference picture ("STRP").

6. The method of claim 5, further comprising:

marking the given LTRP as used for long-term reference to distinguish between the given LTRP and the STRP.

7. The method of claim 1, wherein the determining the LTRP status information for the current picture and/or the setting the syntax elements is subject to a constraint that POC value for each picture that is in the set of reference pictures or waiting for output is computed unambiguously relative to the POC value of the current picture.

8. The method of claim 1, wherein the determining the LTRP status information for the current picture and/or the setting the syntax elements is subject to a constraint on range of POC values for the current picture and the set of reference pictures.

9. A computer system comprising one or more processing units and memory, wherein the computer system implements a video decoder configured to perform operations comprising:

receiving a sequence parameter set;

parsing, from the sequence parameter set, a flag that indicates long-term reference picture ("LTRP") status information is present in a bitstream for pictures of a sequence;

receiving coded data in the bitstream for a current picture among the pictures of the sequence; and decoding the current picture, including determining a set of reference pictures available for the current picture, the set of reference pictures including at least one LTRP, wherein the decoding further includes:

parsing syntax elements from the bitstream, wherein the syntax elements represent LTRP status information for the current picture, wherein the LTRP status information for the current picture identifies which pictures, if any, among the set of reference pictures are available for use as LTRPs for the current picture, the syntax elements including identifying information for a given LTRP in the LTRP status information for the current picture, and wherein the identifying information for the given LTRP is a value of picture order count least significant bits ("POC LSBs"), modulo a most significant bit wrapping point, for the given LTRP for the current picture; and using the LTRP status information to identify which pictures, if any, among the set of reference pictures are available for use as LTRPs for the current picture, wherein the value of the POC LSBs for the given LTRP, modulo the most significant bit wrapping point, is used to at least in part indicate a difference between POC values of the current picture and the given LTRP.

10. The computer system of claim 9, wherein the syntax elements that represent the LTRP status information for the current picture are signaled in the bitstream for the current picture.

11. The computer system of claim 9, wherein the operations further comprise:

using the LTRP status information to manage a decoded picture storage area of a video decoder.

12. The computer system of claim 9, wherein the syntax elements further include a flag for the given LTRP, the flag for the given LTRP indicating whether the given LTRP is used for decoding of the current picture.

13. The computer system of claim 9, wherein the operations further comprise:

sending feedback information for use by a video encoder during encoding, wherein the feedback information represents decoder state information that identifies which pictures are available for use as reference pictures by a video decoder.

14. The computer system of claim 9, wherein the operations further comprise:

reusing the value of POC LSBs for the given LTRP as a value of POC LSBs for another reference picture, wherein the other reference picture is a short-term reference picture ("STRP").

15. The computer system of claim 14, wherein the operations further comprise:

marking the given LTRP as used for long-term reference to distinguish between the given LTRP and the STRP.

* * * * *